United States Patent
Guensche

[15] 3,703,755
[45] Nov. 28, 1972

[54] ADJUSTABLE TOOL HOLDER FOR PRECISELY REPOSITIONING REGROUND CUTTER INSERTS

[72] Inventor: Oscar M. Guensche, Grosse Pointe Park, Mich.

[73] Assignee: Dawson Carbide Industries, East Detroit, Mich.

[22] Filed: Sept. 4, 1970

[21] Appl. No.: 69,551

[52] U.S. Cl. ..................................................29/96
[51] Int. Cl. ..............................................B26d 1/00
[58] Field of Search......29/95, 96, 97, 98, 105, 105 A

[56] References Cited

UNITED STATES PATENTS

| | | | |
|---|---|---|---|
| 2,716,800 | 9/1955 | Bader | 29/96 |
| 3,124,865 | 3/1964 | Clark et al. | 29/96 |
| 3,267,553 | 8/1966 | Mortensen | 29/96 |
| 3,298,107 | 1/1967 | Bergstrom | 29/105 X |
| 3,359,612 | 12/1967 | Mina | 29/105 |
| 3,363,299 | 1/1968 | Gowanlock | 29/105 |
| 3,497,934 | 3/1970 | Hudson | 29/95 |

FOREIGN PATENTS OR APPLICATIONS 928,294    6/1963    Great Britain..........29/105 A Primary Examiner—Harrison L. Hinson
Attorney—Barthel and Bugbee

[57] ABSTRACT

This tool holder replaces the conventional cutter insert tool holder in the use of reground cutter inserts. It moves forward to the original and intended position the reground cutting edge of the hard cutter insert which has been reduced to a sub-standard size by such regrinding. In it, an insert locator in the form of a slide or plunger propelled by a fine adjustment screw engages the reground cutter insert and moves it precisely across the supporting surface of a shim seat mounted in the cutter insert recess of the tool holder, whereupon the reground and thus repositioned insert is secured in its relocated position by a screw-actuated clamp engaging a clip breaker which in turn engages the cutter insert.

3 Claims, 8 Drawing Figures

PATENTED NOV 28 1972
3,703,755
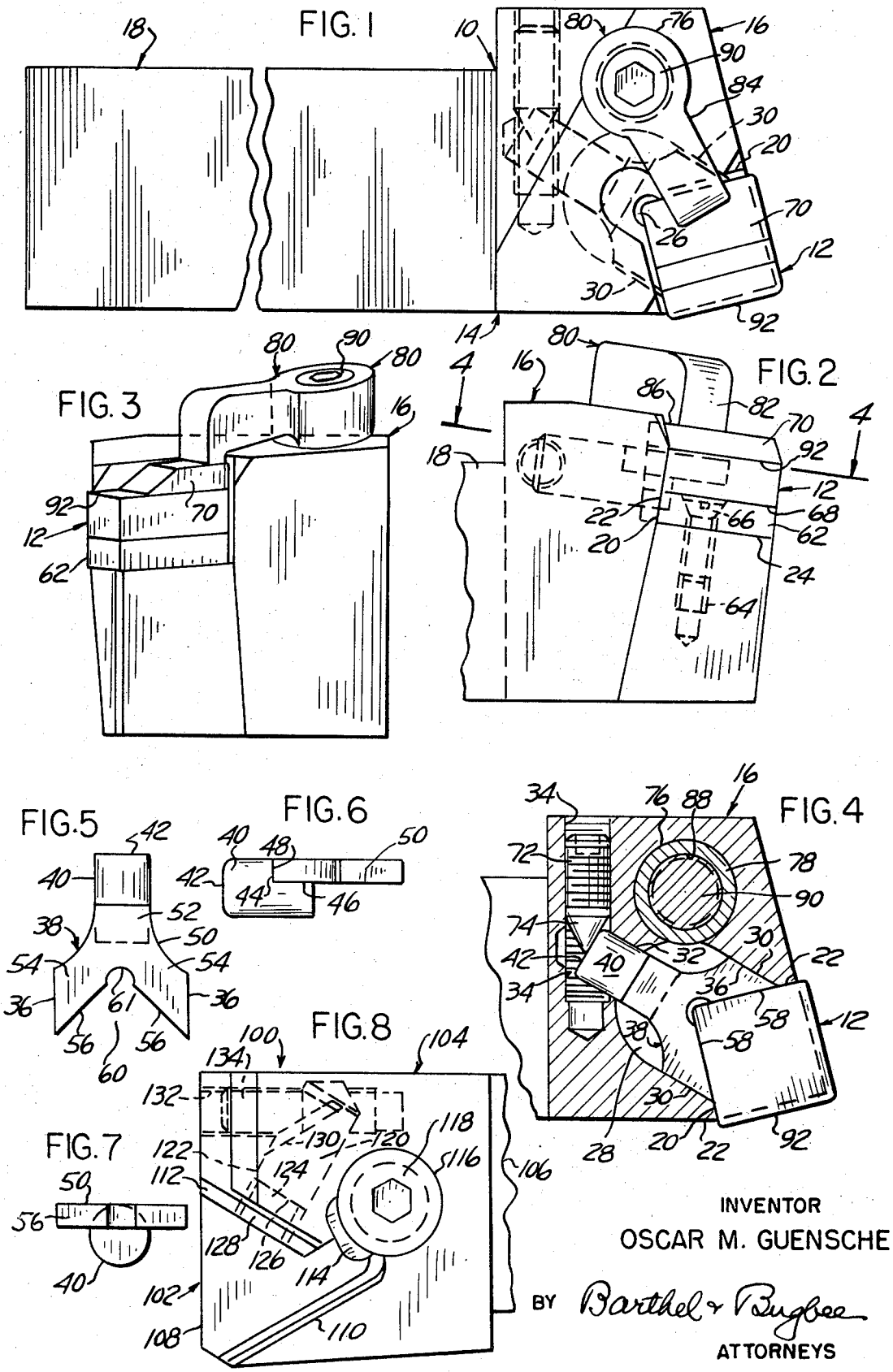
INVENTOR
OSCAR M. GUENSCHE
BY Barthel & Bugbee
ATTORNEYS

ADJUSTABLE TOOL HOLDER FOR PRECISELY REPOSITIONING REGROUND CUTTER INSERTS

SUMMARY OF THE INVENTION

The invention particularly resides in the provision of the insert locator slide moved by means of the fine adjustment screw against the reground cutter insert resting upon the shim seat beneath the chip breaker. The invention is adapted to relocate cutter inserts of various shapes and sizes, such as triangular, rectangular, pentagonal, hexagonal, octagonal and diamond-shaped, of which the triangular and rectangular are most common, and is also adaptable to so-called negative inserts wherein the insert faces intersecting at the cutting edge are perpendicular to one another, as well as to the so-called positive inserts wherein the insert faces intersecting at the cutting edge are at an acute angle to one another.

BACKGROUND OF THE INVENTION

Tool holders containing cutter inserts of extremely hard materials, such as carbide and ceramic materials, have come increasingly into use, with tungsten carbide inserts very commonly used. Such hard materials are very expensive and consequently the inserts made from them are correspondingly expensive. Reclaiming of dull inserts can be carried out by regrinding the dull cutting edges, but this results in inserts of substandard sizes wherein the cutting edges no longer occupy their original positions relatively to the tool holder and the work. The present invention overcomes these disadvantages and enables repeated reuse of the reground and thus reclaimed hard cutter inserts.

In the drawing,

FIG. 1 is a top plan view of an adjustable tool holder for precisely repositioning reground negative cutter inserts, according to one form of the invention, with the shank of the tool holder body broken away to conserve space and permit illustration upon an enlarged scale;

FIG. 2 is a side elevation of the tool holder shown in FIG. 1, with the major part of the tool holder shank omitted for the same reason;

FIG. 3 is a forward end elevation of the tool holder shown in FIGS. 1 and 2;

FIG. 4 is a cross-section inclined slightly to the horizontal along the line 4—4 in FIG. 2;

FIG. 5 is a top plan view of one form of insert locator adapted to be employed in the tool holder of FIGS. 1 to 4 inclusive;

FIG. 6 is a side elevation of the locator shown in FIG. 5;

FIG. 7 is a forward end elevation of the locator shown in FIGS. 5 and 6; and

FIG. 8 is a top plan view of a modified tool holder employing so-called positive inserts of triangular shape.

Referring to the drawing in detail, FIGS. 1 to 4 inclusive show an adjustable tool holder, generally designated 10, for precisely repositioning a reground hard cutter insert 12 of the so-called negative type, wherein the insert faces adjacent the cutting edge intersect at right angles. The tool holder 10 is provided with a tool holder body 14 including a tool holder heat 16 mounted on and integral with a tool holder shank 18 which is adapted for mounting the tool holder 10 in the particular machine tool in which it is used. As indicated by a comparison of the top plan view and side elevation respectively of FIGS. 1 and 2, the shank 18 is in this instance of square cross-section, although adaptable to other cross-sections since the present invention resides in the head 16 and not in the shank 18.

The tool holder head 16 is provided with a cutter-insert-receiving recess 20 which in this instance is intended to receive cutter inserts 12 of square outline and consequently has side walls 22 and a bottom wall 24 substantially perpendicular to one another. Extending inward from the recess 20 is a notch 26 (FIG. 1) opening downward into a semi-circular chamber 28 (FIG. 4) which is connected to the insert recess 20 by a guideway consisting of parallel guide grooves 30 (FIG. 4). At the rearward end of the chamber 28, a smooth bore 32 of circular cross-section opens into a threaded bore 34 with its axis disposed at an obtuse angle to the axis of the smooth bore 32. Mounted in the chamber 28 with its parallel opposite sides 36 slidably engaging the parallel guide grooves 30 is a cutter insert locator, generally designated 38, (FIG. 5) of approximately Y-shaped configuration. The locator 38 consists of a shank 40 of cylindrical shape adapted to snugly but slidably fit the smooth bore 32, the shank 40 having at its rearward end an abutment face 42 perpendicular to its axis. The shank 40 is also provided on its upper side with a rabbet 44 (FIG. 6) with its bottom surface 46 and rearward surface 48 respectively parallel and perpendicular to the axis of the shank 40.

Seated in the rabbet 44 and firmly secured therein as by the use of silver solder is a locator blade 50 of approximately Y-shaped configuration having a rearward portion 52 seated in the rabbet 44 and with forwardly extending arms 54 provided with diverging inner forward faces 56 forming a cutter insert notch 60 fitting and engaging the side faces 58 of the insert 12, with a relief notch 61 for receiving its rearward corner. Optionally the blade 50 may be precision-cast integral with the shank 40.

Mounted in the recess 30 beneath the grooves 30 and resting on the bottom surface 24 thereof (FIG. 2) is a shim seat 62 corresponding in shape to the shape of the cutter insert 12 but of slightly smaller size so as to permit a slight overhang of the cutter insert 12 beyond the shim seat 62. Immediately below the recess 20 in the head 16, the latter is bored and threaded as at 64 (FIG. 2) with its upper end countersunk and with its axis perpendicular to the bottom surface 24 to receive a flat-headed socket cap screw 66 which passes through the correspondingly bored shim seat 62 and secures the latter firmly in position within the recess 22 and against the bottom surface 24 thereof. The cutter insert 12 in turn is seated upon the upper surface 68 of the shim seat 62 which it slidably engages during adjustment, as explained below in connection with the operation of the invention. The cutter insert 12 in turn is held down against the shim seat 62 by a bevel-edged chip breaker in the form of a plate 70.

Adjustment motion of the insert locator 38 and therefore of the cutter insert 12 relatively to the tool holder head 16 is accomplished by means of a cone-tipped socket adjusting screw 72 (FIG. 5) threadedly engaging the threaded bore 34 with its conical tip 74 engaging the substantially flat rearward end 42 of the shank 40 of the insert locator 38. The head 16 is also provided with a bore 76 the upper portion of which is smooth for slidably receiving the correspondingly hollow cylindrical shank 78 of an approximately L-shaped clamp 80, the laterally extending arm 82 of which slidably engages a parallel-sided slot 84 (FIG. 1) which provides guidance for its upward and downward motion in moving its downwardly-projecting tip 86 into and out of clamping engagement with the chip breaker 70 and consequently with the cutter insert 12. The clamp 80 is also bored and threaded internally at 88 to receive the threaded upper end portion of a clamp screw 90, the lower end of which is oppositely threaded, as in a turnbuckle screw with right-hand and left-hand threads, into a correspondingly oppositely threaded coaxial bore (not shown) in the head 16.

In the operation of the adjustable tool holder 10 of FIGS. 1 to 4 inclusive, let it be assumed that the insert 12 has been reground so that it is of sub-standard size because its cutting edge 92 has receded from its original position. To relocate the cutting edge in its original position relatively to the head 16, the operator loosens the clamp 80 by inserting a so-called Allen wrench in the socket of the clamp screw 90 and rotates the latter to cause the clamp 80 to rise. He then pushes the reground cutter insert 12 of reduced size into the cutter insert notch 60 while it rests upon the upper surface 68 of the shim seat 62, then places the chip breaker 70 upon the insert 12 and by means of an Allen wrench in the clamp screw 90 rotates the latter to tighten the clamp 80 lightly upon the assembly of the chip breaker 70 and insert 12 with such a pressure as will hold this assembly in position while still enabling it to be moved for adjustment purposes.

The operator then inserts a so-called Allen wrench in the socket of the adjusting screw 72 (FIG. 4) and rotates the screw 72 so as to advance it in its threaded bore 34, thereby causing its conical tip 74 to engage the rearward end face 42 of the shank 40 of the insert locator 38, thereby moving the locator 38 outward in its guide grooves 30. This action causes the inner forward faces 56 of the locator 38 to engage and push the cutter insert faces 58 outward, thereby causing the cutting edge of the insert 12 to move outward into its original and intended position, as determined by a suitable gauge (not shown) used in connection with the head 16 of the tool holder 10. The operator then rotates the clamp screw 90 by means of its Allen wrench to move the clamp 80 downward and cause its tip 86 to move the chip breaker 70 into clamping engagement with the relocated cutter insert 12 against the upper surface 68 of the shim seat 62. The tool holder 10 is then ready for use.

The modified adjustable tool holder 100 shown in FIG. 8 is similar in principle to the tool holder 10 of FIGS. 1 to 4 inclusive but is adapted to receive, adjust and relocate a triangular cutter insert 102 as before, the tool holder 100 is provided with a head 104 mounted on a shank 106 similar to the shank 18 of FIG. 1. The cutter insert 102, however, is of the so-called positive insert type wherein the cutting edge 108 is formed at the intersection of surfaces which subtend an acute angle rather than a right angle, as in the negative insert 12 of FIG. 1. As before, the cutter insert 102 rests upon a flat surface in a recess 110 in the head 104, and is provided with a bevel-edged chip breaker plate 112, the whole being held down by the arm 114 of a clamp 116, which, as before, is bored and threaded to receive a socket head clamping screw 118 similar to that described above in connection with FIG. 1.

The cutter insert 102 is adjustably moved by a locator rod or plunger 120 of generally cylindrical configuration reciprocably mounted in a guideway consisting of a cylindrical bore 122 disposed obliquely to the sides of the head 104. The forward end portion of the locator plunger 120 is undercut or rabbeted as at 124 to extend over the rearward edge and top surface of the cutter insert 102, which it engages at a shoulder 126. The locator plunger 120 has a flat forward end 128 inclined upward and rearward to the axis of the plunger 120. Finally, the rearward portion of the locator plunger 120 is provided with an obliquely disposed partially cylindrical abutment surface 130 positioned at approximately 30° to the axis of the plunger 120.

The head 104 is provided with a transverse threaded bore 132 with its axis at an angle of about sixty degrees to that of the bore 122 and which receives a corresponding threaded cone-tipped socket adjusting screw 134 similar to the adjusting screw 72 of FIG. 4 and similarly provided with a conical tip 135 subtending an angle of sixty degrees so as to smoothly engage the partially cylindrical abutment surface 130.

In the operation of the modified adjustable tool holder 100 of FIG. 8, let it, as before, be assumed that the cutter insert 102 has been reground so that it is of sub-standard size by reason of the fact that its cutting edge 108 has receded from its original position. To relocate the cutting edge 108 in its original position relatively to the head 104, the operator loosens the clamp 116 by means of an Allen wrench inserted in the socket of the clamp screw 118 in a manner similar to that described above in connection with FIG. 1. He then pushes the reground cutter insert 102 against the undercut portion 124 against the shoulder 126 of the locator plunger 120 while supporting it upon the bottom surface of the recess 110. He then places the chip breaker 112 upon the cutter insert 102 and by means of an Allen wrench tightens the clamp 116 so that its arm 114 presses lightly upon the chip breaker 112 sufficiently to hold the cutter insert 102 in position while permitting it to be adjustably moved.

The operator now inserts an Allen wrench in the socket of the adjusting screw 134 and rotates it so as to advance it in its threaded bore 132, thereby causing its conical tip 135 to engage the abutment surface 130 with a camming action causing the locator plunger 120 to move outward in its bore 122. This action causes the shoulder 126 on the locator plunger 120 to engage and push the cutter insert 102 outward, thereby causing the cutting edge 108 of the cutter insert 102 to move outward until it reaches its original and intended position, as determined by a suitable gauge, as mentioned in connection with the operation of the tool holder 10 of FIG. 1. The operator, by means of an Allen wrench, then rotates the clamp screw 118 to move the clamp 116 and its arm 114 downward against the chip breaker 112 so as to cause the latter to clamp the relocated cutter insert 102 firmly against the bottom surface of the recess 110. The modified adjustable tool holder 100 is then ready for use.

It will be understood that this invention contemplates the use of different forms of insert locators adapted to fit other cutter inserts of different shapes than the quadrilateral or triangular cutter inserts disclosed herein.

It will also be understood that this invention also contemplates the making of the shank 40 and locator blade 50 in a single piece, such as a precision casting.

I claim:

1. An adjustable tool holder for precisely reposigioning the cutting edge of a reground undersized cutter insert in the original location which it occupied before regrinding, said tool holder comprising a tool-holder body having an elongated mounting shank and having an enlarged head containing a cutter-insert-receiving recess with a cutter-insert seat surface therein, a cutter-insert-locator guideway disposed transverse to said recess and communicating therewith, a cutter-insert locator mounted in said locator guideway for adjustment motion longitudinally therealong, a fine adjustment device operatively connected to said locator for moving said locator by minute increments relatively to said head, and a clamping instrumentality on said head movable into and out of clamping relationship with a cutter insert in said recess, said fine adjustment device including a threaded bore in said head communicating with said locator guideway, and also including a fine adjustment screw-threaded member mounted in said threaded bore in position-adjusting relationship with said locator, said threaded bore being disposed obliquely to said locator guideway, said locator having a substantially flat abutment surface thereon disposed at an oblique angle to the axis of said screw-threaded member, and said screw-threaded member having a tip of approximately conical shape thereon operatively engageable with said abutment surface.

2. An adjustable tool holder, according to claim 1, wherein said abutment surface is a substantially flat surface which is disposed substantially perpendicular to the axis of said locator guideway.

3. An adjustable tool holder, according to claim 1, wherein said abutment surface is a substantially partially elliptical surface which is disposed at an oblique angle to the axis of said locator guideway.

* * * * *